(12) United States Patent
Merkel et al.

(10) Patent No.: US 7,256,565 B2
(45) Date of Patent: Aug. 14, 2007

(54) WIPER SYSTEM USING TWO WIPERS

(75) Inventors: Wilfried Merkel, Kappelrodeck (DE); Gebhard Michenfelder, Lichtenau (DE); Claus Fleischer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/296,008

(22) PCT Filed: Dec. 14, 2001

(86) PCT No.: PCT/DE01/04764

§ 371 (c)(1),
(2), (4) Date: Jun. 23, 2003

(87) PCT Pub. No.: WO02/076796

PCT Pub. Date: Oct. 3, 2002

(65) Prior Publication Data

US 2004/0008000 A1 Jan. 15, 2004

(30) Foreign Application Priority Data

Mar. 21, 2001 (DE) .................... 101 13 678

(51) Int. Cl.
*H02P 5/00* (2006.01)

(52) U.S. Cl. ............. 318/443; 318/DIG. 2; 15/250.12; 15/250.27; 15/250.17

(58) Field of Classification Search ............ 318/34, 318/561–565, 265, 443, 445, 625; 15/250.13, 15/250.21, 250.22, 250.23
See application file for complete search history.

(56) References Cited

U.S. PATENT DOCUMENTS 4,585,980 A * 4/1986 Gille et al. ................. 318/444
4,723,101 A * 2/1988 Bauer et al. ................. 318/443
4,900,996 A * 2/1990 Wainwright ................. 318/443
5,023,467 A * 6/1991 Uhl ............................ 307/10.1
5,256,950 A * 10/1993 Matsumoto et al. ........ 318/443
5,331,257 A * 7/1994 Materne et al. ............. 318/85
5,561,882 A * 10/1996 Eustache et al. ......... 15/250.001
5,568,026 A   10/1996 Welch
6,107,766 A * 8/2000 Amagasa .................... 318/443
6,147,466 A * 11/2000 Stronczek ................... 318/443
6,281,649 B1 * 8/2001 Ouellette et al. ........... 318/443
6,288,509 B1 * 9/2001 Amagasa .................... 318/443

(Continued)

FOREIGN PATENT DOCUMENTS

DE    32 08 121    9/1983

(Continued)

*Primary Examiner*—Lincoln Donovan
*Assistant Examiner*—Renata McCloud
(74) *Attorney, Agent, or Firm*—Kenyon & Kenyon LLP

(57) ABSTRACT

A wiper system using two wipers and two wiper motors, which drive the wipers and of which at least one first wiper motor forms a sub-assembly with an electronic control unit. The second wiper motor is a rotary motor having only one sensory system for detecting the absolute and relative rotational position of its driven shaft, which generates corresponding signals for the control unit of the first wiper motor, and the first wiper motor, in the rotational speed and the rotational position of its driven shaft, is regulated by the control unit as a function of the rotational position and the rotational speed of the driven shaft of the second wiper motor.

9 Claims, 3 Drawing Sheets

U.S. PATENT DOCUMENTS 6,400,110 B1 * 6/2002 Yabe et al. .................. 318/443
6,425,160 B1 * 7/2002 Saito ........................ 15/250.22
6,867,559 B2 * 3/2005 Bolz et al. .................... 318/68

FOREIGN PATENT DOCUMENTS

| | | |
|---|---|---|
| DE | 32 48 118 | 6/1984 |
| DE | 41 25 268 | 6/1992 |
| DE | 44 28 543 | 2/1996 |
| DE | 196 34 559 | 3/1998 |
| EP | 0 952 054 | 10/1999 |
| FR | 2 785 246 | 5/2000 |

* cited by examiner

WIPER SYSTEM USING TWO WIPERS

FIELD OF THE INVENTION

The present invention relates to a wiper system using two wipers.

BACKGROUND INFORMATION

Different types of wipe areas and driving devices are known for cleaning windshields of motor vehicles. With respect to wipe areas, distinctions are mainly made between single-arm wipe areas and dual-arm wipe areas. In dual-arm wipe areas, the wiper arms of the wipers may be operated in tandem or in opposition.

Even in the case of two wipers, the drive device generally uses only one wiper motor whose rotary drive movement of its driven shaft is translated into an oscillating swivel motion of the drive shafts of the wipers via a spatial crank drive. Newer wiper motors are provided with electronics which regulate a reversing drive movement of the driven shaft. The electronics also allow a control of the wipe angle including a dynamic, load-dependent wipe-angle correction and wiping-speed regulation, thereby producing a larger nominal wiped area on the windshield. Furthermore, the electronic system allows different wipe functions and positions, such as an extended parking position, a service position for changing a wiper blade, an interval parking position and an alternating parking position for relieving the load on the wiper blades.

The wiper motors having an electronic system are provided with a control device including sensors for regulating the position and speed of the driven shaft and a micro-controller for detecting the position of the driven shaft. This leads to higher expenditures for the control device and requires additional space in the hood.

Wiper systems using opposed wipers are often used for wiping larger windshields. If these systems are driven by a wiper motor, a large size in accordance with the vehicle width results and a large space in the center of the vehicle. Also, the kinematic design with or without intermediate bearing is complicated and necessitates a large, high-capacity wiper motor. The many individual mechanical components produce large static wipe-angle tolerances in addition to dynamic wipe-angle tolerances which are caused by elasticities of the mechanical components and of the components of the support and fastening elements.

In order to obtain a less complex kinematic design and, thus, smaller wiping-angle tolerances, wiper systems using two wiper motors are utilized, which are located in the area of the wiper bearings and, therefore, do not require space in the center region of the windshield. Two synchronously running wiper motors having electronic communication are used for the driving. To satisfy the high demands placed on the wiper system in connection with synchronous running, safety and reliability, collision freedom, and also the security concept and emergency function, each wiper motor is provided with a full electronic system. Wiper motors are preferably regulated in reversing operating so as to obtain the advantages associated therewith.

SUMMARY

According to an example embodiment of the present invention, the second wiper motor is designed as a rotary motor and has only one sensory system for detecting the absolute and relative rotational position of its driven shaft. The sensory system generates corresponding signals for the control unit of the first wiper motor to which it is connected via a communication interface. From these signals, the control unit advantageously forms a setpoint value for regulating the rotational position and rotational speed of the first wiper motor, so that it is regulated as a function of the rotational position and the rotational speed of the driven shaft of the second wiper motor. The first wiper motor, which works as a so-called "master", is expediently, but not necessarily, positioned on the driver side of the vehicle and is preferably operated in reversible operation. Accordingly, the second wiper motor, also known as a "slave", is mounted on the passenger side.

These measures according to the present invention keep the cost and complexity associated with the entire wiper system having two wiper motors very low. Moreover, the second wiper motor requires less space since it has no separate electronic control unit, especially no micro-controller. Nevertheless, the complete function of the reversing motor is available on the driver side, such as a wipe-angle correction, extended parking position etc. Lastly, a security concept is possible by which the collision of the wipers is avoided, among others. To communicate and control the output of the second wiper motor, the first wiper motor has an interface, or direct wiring, via which the signals of the sensory system of the second wiper motor may be transmitted as well.

A power switch, which is controlled by the control unit of the first wiper motor, may be advantageously provided for the wiping speeds of the second wiper motor. The second wiper motor advantageously may be a permanently energized three-brush direct-current motor having one gear step, the wiping speeds of the second wiper motor being switched via the power supply to the brush. The sensory system for detecting the position of the rotational speed of the driven shaft of the second wiper motor has segmented permanent magnets with associated Hall sensors which generate digitally encoded signals. In this case, the parking position of the wiper, which is characterized by the position of a segment of a permanent magnet, is detected by a Hall sensor, whereas the instantaneous angle position of the wiper results from the addition of incremental values, which are derived from counting pulses of an additional Hall sensor in connection with permanent magnets located on a periphery of a rotating component.

Alternatively to the signal transmitter for the parking-position signal, the sensory system may have an absolute transmitter, preferably an AMR sensor (anisotropic magneto-resistive).

In a further advantageous variant, to detect the position and the rotational speed of the driven shaft, the sensory system includes a segmented, three-track contact disk having sliding contacts, which is positioned at a component rotating together with the driven shaft, for instance, a worm gear. The middle contact track is used to supply the voltage via a slider, whereas an adjacent track has a contact surface which is sampled by an additional slider and generates a parking-position signal in that the electric circuit to the center slider is closed. The other adjacent track has contact surfaces evenly distributed over the circumference, which, in connection with an additional slider, similarly have counting pulses for an incremental position detection.

Further advantages result from the following description of the drawings which show exemplary embodiments of the present invention. The drawings, the specification and the claims contain numerous features in combination. One

DETAILED DESCRIPTION

Figure 1:
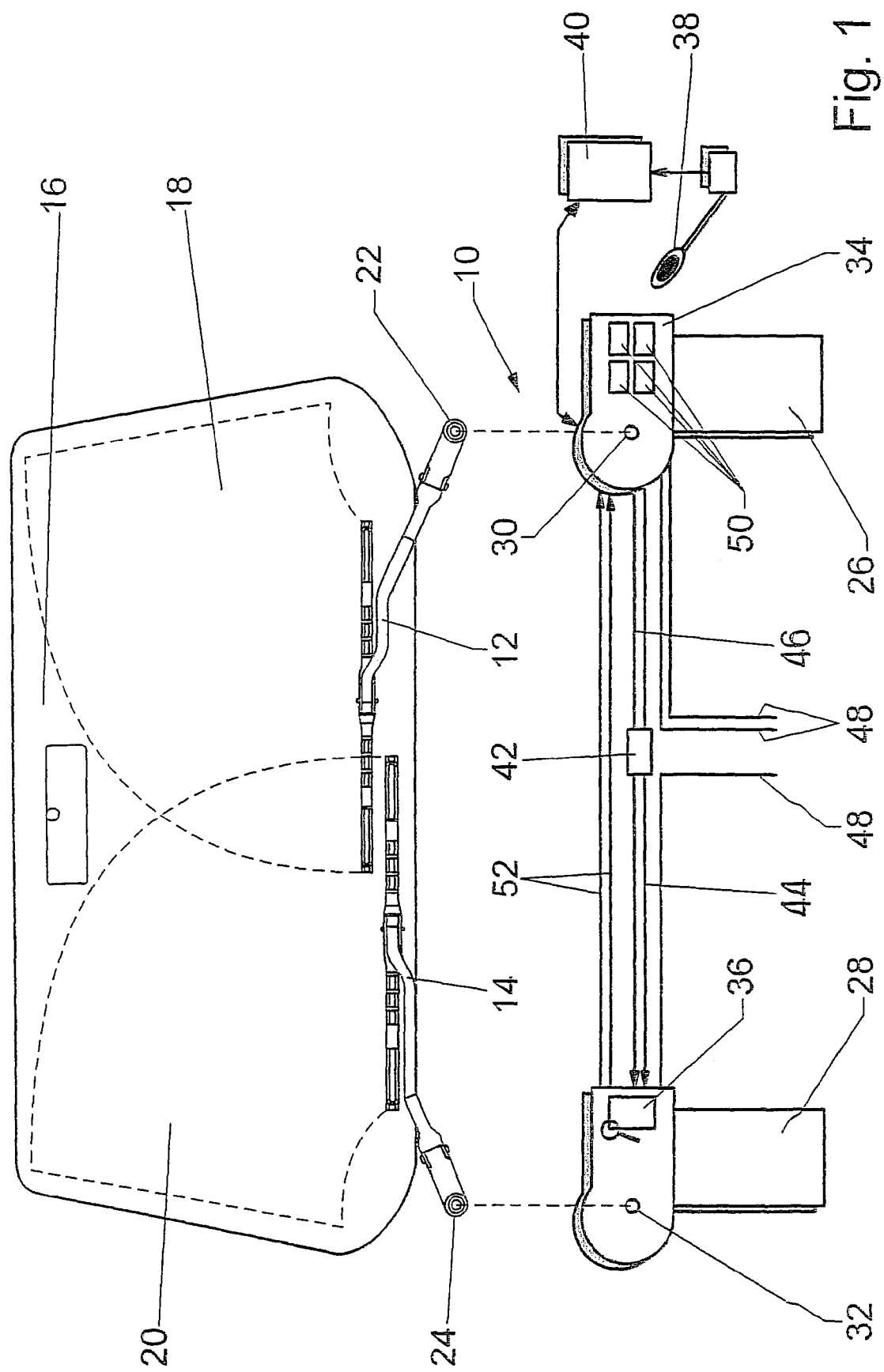
FIG. 1 shows a schematic representation of a wiper system configured according to the present invention.

Wiper system 10 includes two wipers 12, 14, which sweep over wipe areas 18, 20 on a windshield 16 of a vehicle (not shown further) in the course of a swiveling motion about their drive shafts 22, 24.

A first wiper motor 26, via its driven shaft 30, drives drive shaft 22 of wiper 12 on the driver side of the vehicle, while a second wiper motor 28, by its driven shaft 32, drives drive shaft 24 of wiper 14 on the passenger side. First wiper motor 26, which is designed as reversing motor, has an electronic control unit 34 with control elements 50 to regulate the reversing operation and rotational speed as well as the rotational position of driven shaft 30 and, thereby, of wiper 12. Control elements 50 include means for analyzing the input signals and stored characteristics maps, and a sensory system 36 for detecting the rotational position and rotational speed of driven shaft 30, such as a micro-controller, an AMR sensor etc.

Second wiper motor 28, which is designed as a conventional, permanently energized three-brush direct-current motor having one gear step and a rotary motor design, has only one sensory system 36 to detect the absolute and relative rotational position of its driven shaft 32. Wiper motors 26, 28 are connected to the vehicle electrical system via supply lines 48. Wiper system 10 is activated by an operating lever 38, sending a signal to control unit 34 via a central electronic system 40. In accordance with the signal, control unit 34 switches a first power stage 44 or a second power stage 46 of second wiper motor 28, via a power switch 42, the rotational speed expediently being implemented via the current supply to the brushes.

Sensory system 36 detects the rotational position of driven shaft 32 of second wiper motor 28, especially the rotational position corresponding to the parking position of wiper 14. It also generates counting pulses which may be used to determine an incremental position and the rotational speed. Second wiper motor 28 transmits the generated signals via signal lines 52 to control unit 34 of first wiper motor 26, which determines from these signals a setpoint value for the rotational position and rotational speed of driven shaft 30 of first wiper motor 26.

Figure 2:
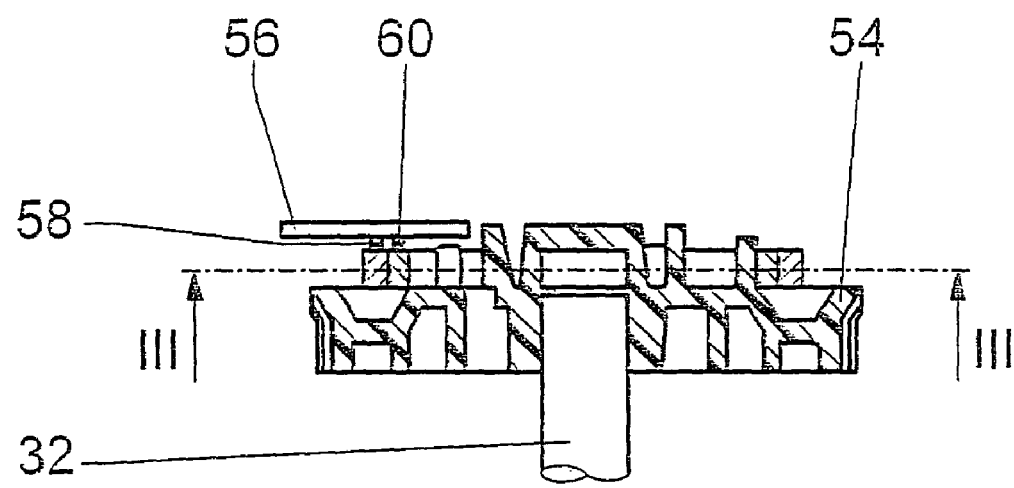
FIG. 2 shows a schematic partial section through a sensory system having Hall sensors for a rotational position and rotational speed.
Figure 3:
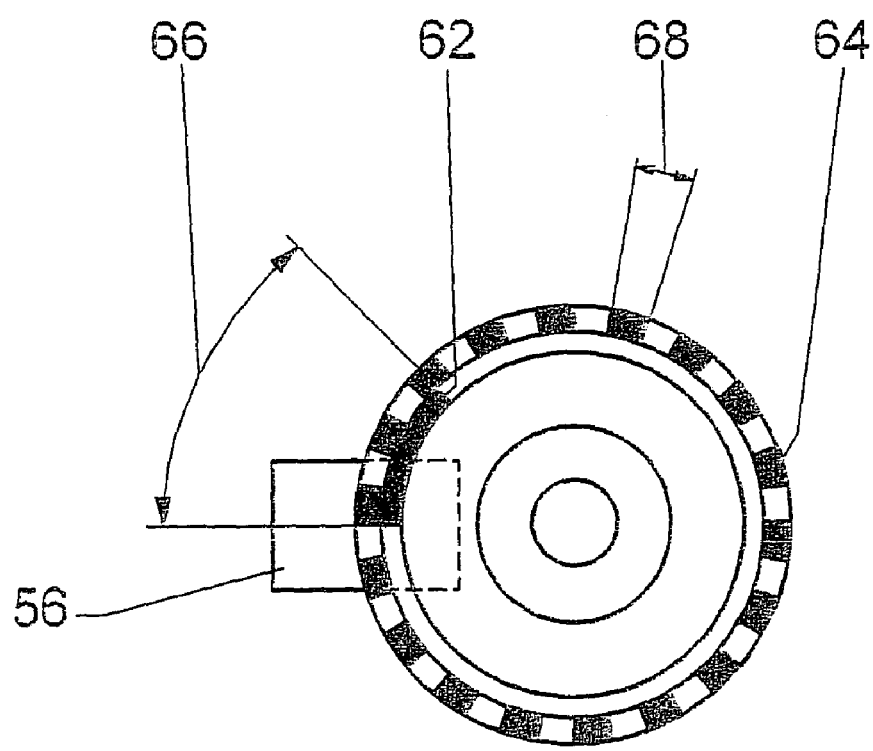
FIG. 3 shows a schematic section according to line III-III in FIG. 2.
Figure 4:
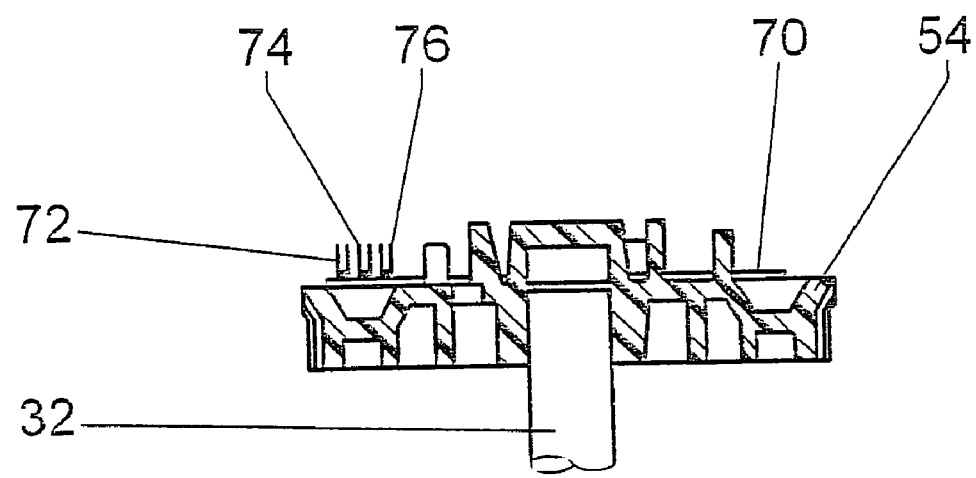
FIG. 4 shows a schematic partial section through a sensory system having a three-track contact disk for a rotational position and rotational speed.
Figure 5:
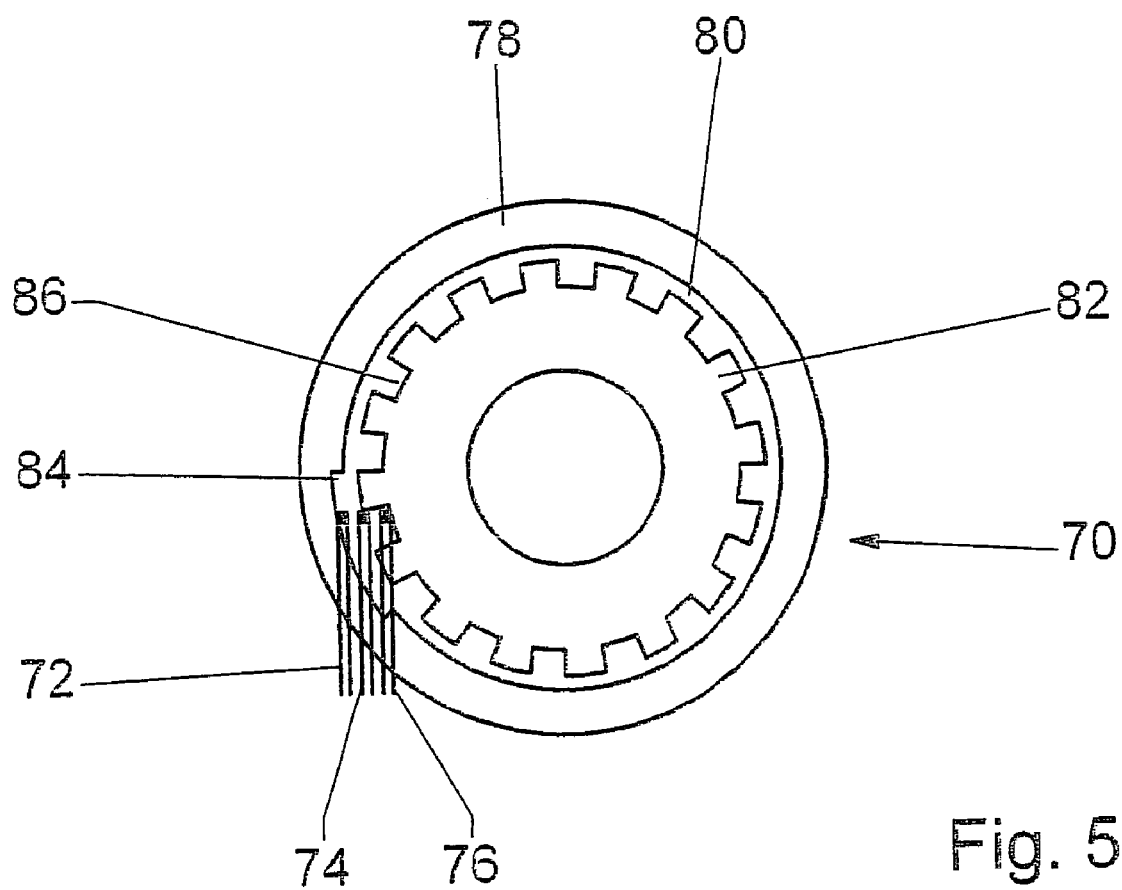
FIG. 5 shows a plan view of a three-track contact disk according to FIG. 4.

FIGS. 2 and 3 as well as FIGS. 4 and 5 show two advantageous versions of a sensory system 36 for the rotational position and rotational speed of driven shaft 32 of second wiper motor 28. Driven shaft 32 is driven in a conventional manner by the electric motor via a worm and a worm gear 54. Located on worm gear 54, on circular paths, are segmented permanent magnets 62, 64. Permanent magnet 62 occupies a segment of approximately 40 degrees and is used to determine the parking position. Permanent magnets 64 are evenly distributed over the outer circular path and occupy a small segment 68. Permanent magnet 62 of the inner circular path cooperates with a Hall sensor 60, whereas permanent magnets 64 of the outer circular path cooperate with a Hall sensor 58. Both Hall sensors are installed on a housing-mounted circuit board 56 and generate a signal as soon as they are passed with little play and a permanent magnet 62, 64 during a rotary motion of driven shaft 32 or worm gear 54. In the process, the signal generated by permanent magnet 62 indicates the parking position of the wiper, whereas permanent magnets 64 generate counting pulses on the outer path, which are analyzed in control unit 34 to detect an incremental position and to determine the rotational speed.

The design of sensory system 36 according to FIGS. 4 and 5 includes a three-track contact disk 70 which is affixed to worm gear 54. The tracks are configured in a circle and concentrically to the axis of rotation of driven shaft 32. A middle track 80, which is sampled by a slider 74, has a continuous contact area and is used to supply voltage to sensory system 36. Outer track 78 has a contact area 84 extending over a larger segment, approximately in the range of forty degrees, and cooperates with a slider 72. When slider 72 touches contact area 84, the electric circuit to slider 74 is closed and a signal indicating the parking position of wiper 14 is triggered. Inner track 82 has a plurality of contact areas 86 distributed over the circumference, which are sampled by a slider 76 and generate counting pulses, which are used to detect the incremental position and to determine the rotational speed of driven shaft 32. Sensory system 36 according to the embodiments shown in FIGS. 2 and 3 as well as in FIGS. 4 and 5, is inexpensive and does not require additional space.

What is claimed is:

1. A wiper system, comprising:
only one electronic control unit;
two opposed wipers, wherein drive shafts of the wipers are situated near lateral boundaries of a windshield; and
two wiper motors situated in a region of the drive shafts and configured to drive the wipers, wherein:
a first one of the wiper motors functions as a master and forms a sub-assembly with the electronic control unit, the electronic control unit being excluded from the second one of the wiper motors,
the sub-assembly includes a microcontroller and a control element for regulating a rotational speed and a rotational position of a drive shaft of the first one of the wiper motors,
a second one of the wiper motors functions as a slave and is designed as a rotary motor and includes only a sensory system for detecting an absolute and a relative rotational position of a drive shaft of the second one of the wipermotors,
the sensory system generates corresponding signals for the electronic control unit of the first one of the wiper motors,
the electronic control unit regulates the rotational speed and the rotational position of the drive shaft of the first one of the motors as a function of a rotational position and a rotational speed of the drive shaft of the second one of the wiper motors, and
the sensory system includes an anisotropic magnetoresistive (AMR) sensor.

2. The wiper system as recited in claim 1, wherein the first one of the wiper motors is designed as a reversing motor, and wherein the control element regulates a reversing operation.

3. The wiper system as recited in claim 1, wherein the sensory system includes segmented permanent magnets having associated Hall sensors, which generate a signal for a parking position of the wipers and counting pulses for incrementally detecting the rotational position and determining the rotational speed of the second one of the wiper motors.

4. The wiper system as recited in claim 1, wherein the sensory system includes an absolute transmitter.

5. The wiper system as recited in claim 1, wherein the sensory system includes a segmented, three-track contact disk having sliding contacts, which is positioned on a component rotating with the drive shaft of at least one of the wiper motors.

6. The wiper system as recited in claim 1, further comprising:

a power switch controlled by the electronic control unit for the wiping speeds of the second one of the wiper motors.

7. The wiper system according to claim 1, wherein the second one of the wiper motors is a permanently energized three-brush direct-current motor having one gear step.

8. The wiper system as recited in claim 7, wherein wiping speeds of the second one of the wiper motors are regulated via a current supply to the brushes.

9. The wiper system as recited in claim 1, wherein the first one of the wiper motors is located on a driver side of a vehicle and the second one of the wiper motors is located on a passenger side of the vehicle.

* * * * *